Nov. 2, 1937.                J. M. WEYDELL                2,097,483
                        ELECTRICAL HEATING SYSTEM
                         Filed May 17, 1935        2 Sheets-Sheet 1

Inventor
Jarl M. Weydell
by Parker & Carter
Attorneys.

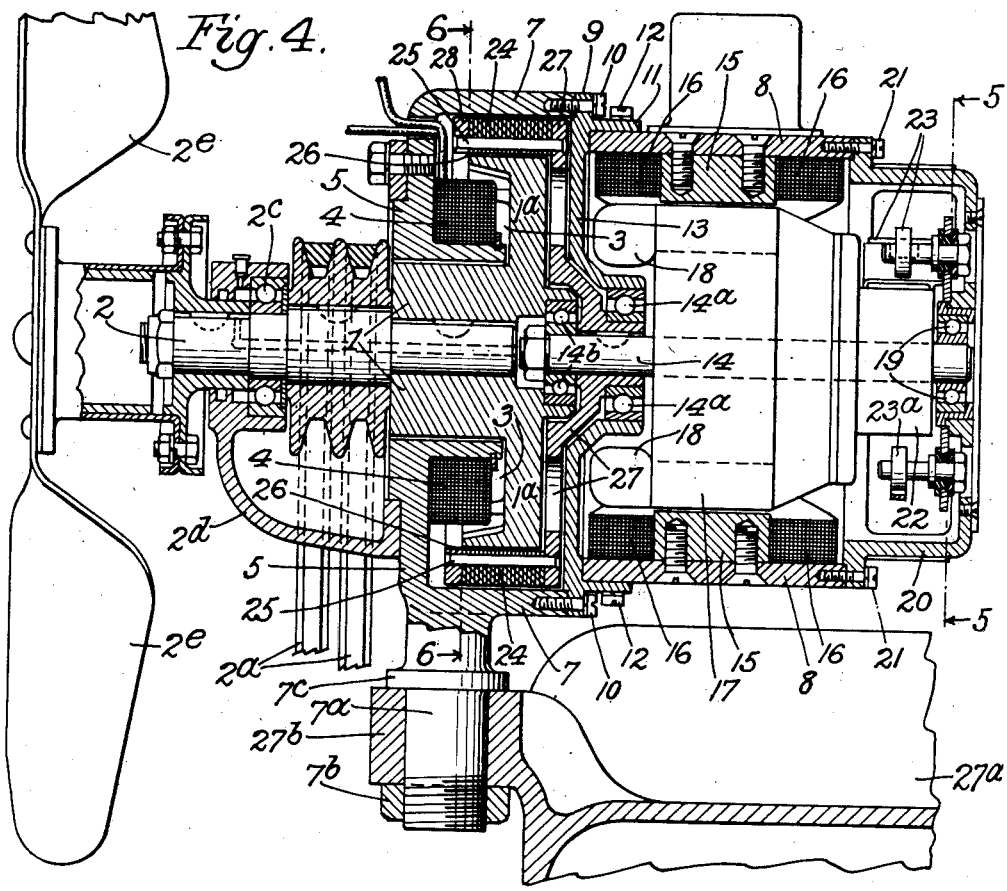
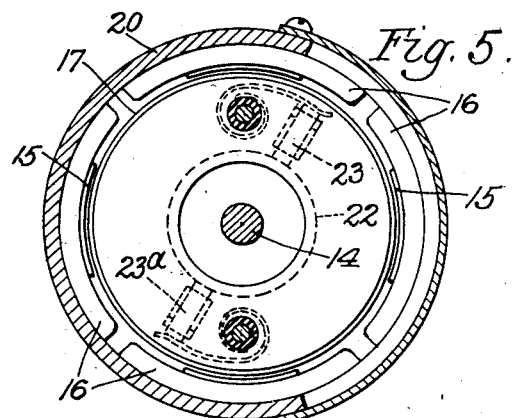

Patented Nov. 2, 1937

2,097,483

UNITED STATES PATENT OFFICE 2,097,483

ELECTRICAL HEATING SYSTEM

Jarl M. Weydell, Chicago, Ill.

Application May 17, 1935, Serial No. 21,965

7 Claims. (Cl. 219—20)

This invention relates to an electrical heating system particularly adapted for use on automobiles, and has for its object to provide a new and improved system of this description.

The invention has as a further object to provide an electrical heating system for automobiles to be used to supply current to an electric heating device on the automobile, as well as to supply current to the battery.

The invention has as a further object to provide such a system wherein there is a magnetic induction clutch in conjunction with the generator and interposed between the generator and the engine, by means of which the electrical output of the generator remains substantially constant over a wide range of speeds of the engine, regardless of the cutting in or out of any or all of the coils of the heating device.

The invention has other objects which are more particularly pointed out in the accompanying description.

Referring now to the drawings, Fig. 1 is a view of the front end of the automobile showing one form of electrical heating system embodying the invention;

Fig. 4 is an enlarged longitudinal sectional view taken through the generator shown in Fig. 1;

Fig. 5 is a sectional view taken on line 5—5 of Fig. 4; and

Like numerals refer to like parts throughout the several figures.

Figure 1:
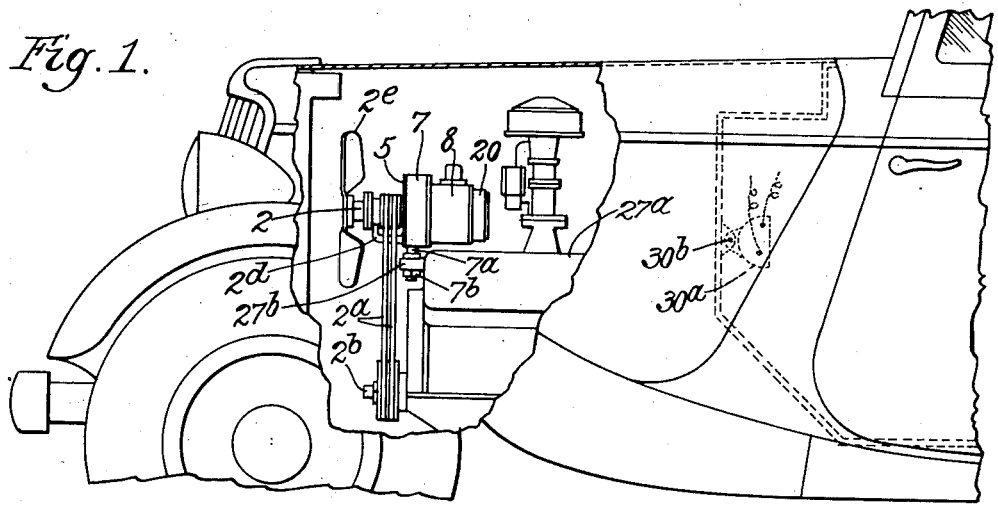

In the drawings I have illustrated the device in connection with an automobile, as it is particularly adapted for use in connection therewith. In the preferred form of the invention I provide a magnetic clutch and a generator whose shafts have a common axis. The magnetic clutch consists of a clutch pole or member 1 which is attached to a shaft 2 driven by the engine. This shaft may be the engine shaft, it may be the generator shaft, or it may be some other shaft, but whatever the shaft is, it is driven by the engine.

As shown in Fig. 1, the shaft is the fan shaft 2 which drives the fan 2e, driven by a belt 2a from the engine shaft 2b. This clutch pole is of itself provided with separated pole pieces 1a, and they are recessed at the side, as shown at 3. Projecting into this recess is a field winding 4 which is attached to the automobile in any desired manner so as not to rotate, as for example by the supporting member 5. The field winding 4 may consist of one or more individual coils connected to the battery and to the electric heater. Since the field winding 4 is stationary and does not rotate, all necessary connections may be made directly to the terminals, no brushes or collecting rings being required. This greatly reduces the expense and increases the reliability of the device.

The supporting member 5 has a laterally projecting part 7 to which the generator frame 8 is connected. The connection of the generator frame is made by a separate ring 9, which is preferably non-magnetic and which is fastened to the support 5 by the fastening devices 10. This ring has a laterally projecting part 11 which is fastened to the generator frame by the fastening devices 12. This ring 9 has a web 13 which projects inwardly and which surrounds the armature shaft 14, being perforated to receive it, and which forms a support for the bearing 14a of the armature shaft.

The frame 8 of the generator has poles 15 carrying coils 16. The poles are opposed to the armature 17. This armature has coils 18 extending all around it and these may be the standard armature coils. The generator has a plurality of poles 15 and a plurality of shunt coils 16. There of course can be any even number of poles and any number of coils desired. The armature has a large number of coils 18, the number depending upon the conditions. For example, I have used with good result twenty-five of these coils. The other end of the armature shaft is supported by a bearing 19 in a cup shaped bracket 20 which is attached to the frame 8 of the generator by fastening devices 21. This armature has a commutator 22 with the brushes 23 and 23a on said commutator.

The magnetic clutch comprises the clutch pole pieces 1a which are fixed to the shaft and rotated by the engine. Opposed to the clutch poles is the other member 24 of the clutch, which is the rotor and which is a laminated iron ring 24 extending entirely around the clutch pole pieces. Embedded in this iron ring is a series of highly conductive bars 25 of brass, copper, aluminum, or other suitable material. These bars should fit closely to the inner face of the ring. They may even have a part of their periphery exposed if desired. There is an air gap 26 between the inner face of the iron ring and the outer faces of the clutch pole pieces. This gap should be very small in order to obtain a high magnetic flux density in the magnetic circuit which includes the iron ring. It is preferably 15/1000th of an inch or less.

Attached to this iron ring 24 is a spider or web 27 of highly conductive material, such as copper, brass, aluminum, or the like, which is perforated to receive the shaft 14 and is rigidly fastened thereto, the bearing 14a of the armature being between its hub and that of the web 13. The armature shaft has another bearing 14b between it and the clutch pole or member 1. This is not actually necessary, but is a construction which makes the device compact. On the other side of the iron ring 24 is a ring 28, which is also of highly conductive material, such as copper, brass, aluminum or the like, and the bars 25 connect with the ring 28 and the spider 27.

To secure compactness, the magnetic clutch and generator are mounted on the engine 27a in some suitable manner. As herein shown, the engine has a forwardly projecting part 27b and the member 7 has a supporting member 7a attached thereto. The supporting member 7a passes through an opening in the member 27b and is held in place by the nut 7b. There is an annulus or flange 7c attached to the member 7 which rests on top of the member 27b. The shaft 2 has a bearing 2c which is carried by a support 2d attached to the supporting member 5.

The magnetic flux produced by current flowing in the field windings 4 passes through the pole pieces 1a, cutting through the iron ring 24 and returning through the frame 7 to the pole 1. When the shaft 2 is rotated, the magnetic flux, which is concentrated at the pole pieces 1a, is caused to move across the conductive bars 25 of the iron ring 24, thereby inducing potentials in the said bars. Since the bars are short circuited by the conductive end plates 27 and 28, large induced currents flow in these closed circuits, which in turn set up magnetic forces tending to oppose the motion causing the induction, and thereby exerting a pull or torque on the iron ring 24. This torque is transmitted through the spider 27 to the armature shaft 14, thus causing the armature 17 to be rotated. The rotation of the armature between its pole pieces generates current which is collected at the commutator in the usual manner.

The magnetic clutch, when employing a single field coil, provides a substantially constant pull or torque on the armature shaft. The generator on the other hand, being generally shunt wound, tends to increase its output potential when its speed of rotation is increased. Therefore, more power is required to drive the generator at higher speeds, but the magnetic clutch will not deliver this additional power to the armature shaft because of its limited torque. Thus, as the speed or rotation of the clutch driving member 1 increases, the amount of slip increases, tending to keep the armature rotating at the desired speed, regardless of wide variations in the driving or motor speed.

By properly designing the magnetic circuit of the clutch and the electrical circuits comprising the conductive bars and end plates of the iron ring 24, and taking into consideration the characteristics of the generator which is to be employed, I can obtain by this device a good average regulation of the system under all ordinary operating conditions.

Figure 2:
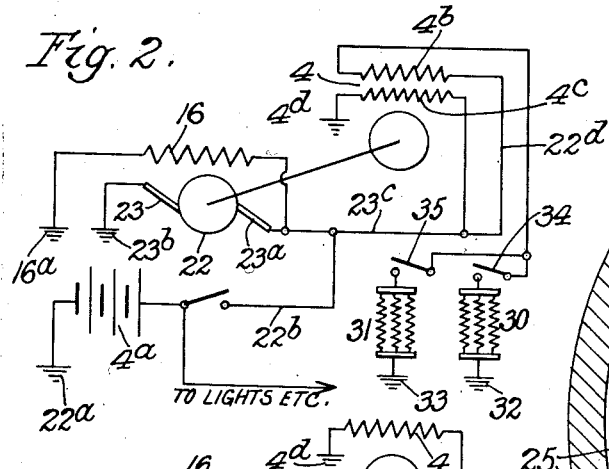
Fig. 2 is a diagrammatic view showing a modified construction.
Figure 6:
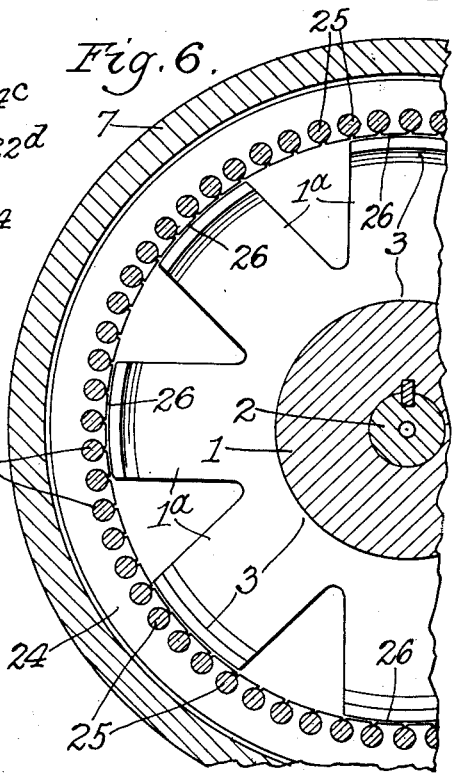
Fig. 6 is a sectional view taken on line 6—6 of Fig. 4.

However, in some applications it may be desirable to use additional means for obtaining better regulation of generator output. For example, as shown in Fig. 2, I may employ a compound field winding in the clutch, consisting of a shunt coil 4c grounded at 4d and connected across the generator output, the brush 23 of the generator being grounded at 23b. The coil 16 of the generator is grounded at 16a and a series or compensating coil 4b is connected so that it carries only the current which flows to the heater coils 30 and 31, which are grounded at 32 and 33 and which are controlled by the switches 34 and 35.

It is of course evident that any number of coils may be used in the heater, and I have shown diagrammatically these two heating elements which can be placed at different positions in the automobile, one for example, the heater 30 being placed at the front of the automobile for the people in the front seat, and the other one being placed in the rear for the people in the rear seat. These heating coils would preferably be placed in reflectors 30a arranged to direct the heat in the direction desired, the reflectors preferably adjustably mounted, as by means of a pivot 30b.

In this case the shunt coil 4c is designed so that its magnetic flux provides sufficient drive through the clutch to supply the battery 4a which is grounded at 22a and connected to the generator output by conductors 22b and 22c with ample charging current at all times. The coil 4b is connected in this circuit by the conductor 22d. The series or compensating coil is electrically insulated from the shunt coil, but the two are contiguous and comprise the field winding, generally designated as 4.

The direction of the series coil is such that the load current flowing through it generates additional magnetic flux in the same direction as that produced by the shunt coil thus increasing the torque applied to the armature shaft 14 and supplying additional driving power to the generator as it is needed to supply current to the heater, etc. With this arrangement, the power output of the generator varies in proportion to the electrical demand of the system, the voltage remaining substantially constant regardless of the speed of rotation of the clutch driving member 1.

Figure 3:
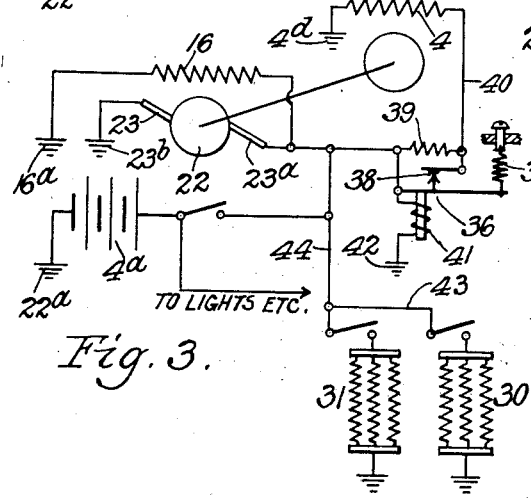
Fig. 3 is a diagrammatic view showing a further modified construction.

In some applications of my magnetic clutch I have found it desirable to employ a third method of regulation, particularly where the output potential of the generator must be kept constant within very narrow limits. In this case, shown in Fig. 3, I employ a single field winding 4 in the clutch, designed as described for average performance, but in addition I make use of an external voltage regulator 36. This regulator may be of the conventional type, consisting of a voltage sensitive relay with a spring adjustment 37 for setting the control point as required. The relay contacts 38 are shunted by a resistance 39 and connected in series with the circuit 40 which supplies the clutch field winding 4 with current. When the generator output voltage is below the control point, the spring 37 holds the relay contacts 38 closed and the clutch field 4 is fully energized. Now as the voltage rises above the control point, the relay magnet 41 opens the contacts 38 and introduces resistance 39 in series with the field winding 4, thus increasing the slip in the clutch and lowering the voltage. If it falls too low, the contacts again close, reducing the clutch slip and bringing the voltage back to the control point.

The coil 41 is grounded at 42 and the circuit 43 leading to the heating coils 30 and 31 is connected directly with the conductor 44 leading to the generator. Thus with this relatively simple means the voltage of the system may be accurately maintained at a constant level regardless of wide fluctuations in driving speed or load current, or both.

I have found that the system comprising a magnetic clutch driving a generator is extremely complex and difficult to determine quantitatively in all of its aspects, due to the many variables which operate simultaneously. However, by taking into careful consideration the speed, slip and load characteristics of both the generator and the magnetic clutch, I can so design and proportion the active parts of the clutch and its associated circuits that I obtain an overall performance of the system, even with single coil field winding, which is superior to direct drive generator arrangements employing the so-called third brush method of regulation now in general use. My invention also provides the added advantage of always operating the generator at a relatively low speed, regardless of the number of coils of the heater that may be in circuit, thus reducing wear on bearings, brushes and commutator and increasing the life and reliability of the generator. This device responds to either the electrical load or the battery condition or to both.

I claim:

1. An electrical heating system for automobiles comprising an electrical generator, a driving device therefor out of mechanical connection with the generator, throughout the entire operation of the device, a variable speed motor for driving the automobile, said generator and driving device fixed in position on the automobile in proximity to said motor, a driving connection from said motor to said driving device, an electric heater mounted on said automobile, an electrical connecting device for connecting said electrical heater in circuit with said generator, and means for causing the speed of the generator to fall behind the speed of the driving device as the speed of the driving device increases, whereby a substantially constant potential is maintained for the current passing to said heater.

2. An electrical heating system for automobiles comprising an electrical generator, a variable speed motor for driving said automobile and said generator, said motor and generator mounted on said automobile in proximity to each other, a heating device mounted on said automobile and electrically connected with the generator, and a connecting device between the generator and the motor for maintaining the electrical current generated by the generator at a substantially constant voltage regardless of the speed of the motor, whereby the heating device is supplied with a substantially constant voltage current throughout the variations in speed of the motor.

3. An electrical heating system for automobiles comprising an electrical generator, a variable speed motor for driving said automobile and said generator, said motor and generator mounted on said automobile in proximity to each other, an electrical heater connected in circuit with said generator, and a variable driving connection between the generator and the motor which automatically decreases the speed of the generator relative to the speed of the motor as the motor is speeded up, so as to deliver a substantially constant potential current to the heater.

4. An electrical heating system for automobiles comprising an electrical generator, a variable speed motor for driving said generator, said motor and generator mounted on said automobile in proximity to each other, a heater operatively connected in circuit with said motor, a magnetic connecting device for transmitting the driving power from the motor to the generator, and means associated with said magnetic connecting device for providing a slip between the magnetic connecting device and the generator, which slip increases as the speed of the motor increases, whereby a substantially constant potential current is delivered to said heating device.

5. An electrical heating system for automobiles comprising an electrical generator, a variable speed motor, said motor and generator mounted on said automobile, the generator mounted upon said motor, a heating device connected with said electrical generator, a driving connection between the generator and the motor, and means forming a part of said driving connection for varying the speed of the generator inversely as the speed of the motor varies, whereby a substantially constant potential current is delivered to the heating device.

6. An electrical heating system for automobiles comprising an electrical generator, a driving device therefor out of mechanical connection with the generator a variable speed motor for driving said automobile and said driving device, said driving device mounted on said motor, said generator mounted on said driving device, an electrical heater mounted on said automobile, a connecting device for connecting said electrical heater in circuit with said generator, and means for causing the speed of the generator to fall behind the speed of the driving device as the speed of the driving device increases, and a separate regulating device, a circuit connecting said regulating device with said driving device, whereby a substantially constant potential is maintained for the current passing to said heater.

7. An electrical heating system for automobiles having hoods, comprising an internal combustion engine for driving the automobile, a generator, a magnetic driving device therefor, said generator and magnetic driving device mounted on said engine beneath the hood, a driving connection between the magnetic driving device and the engine, a heater on the automobile, and electrical connections between said generator and said heater.

JARL M. WEYDELL.